Figure 4:
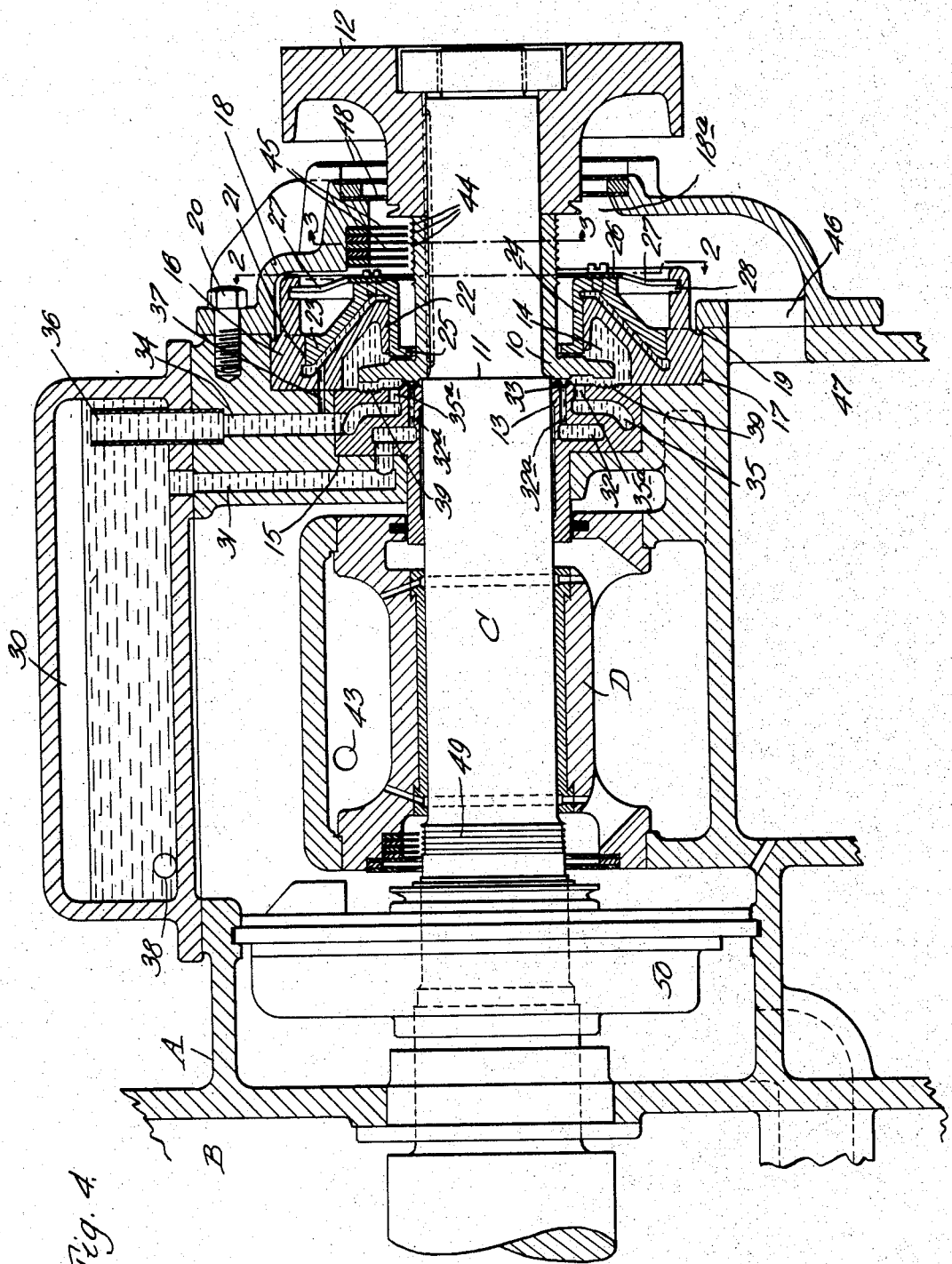

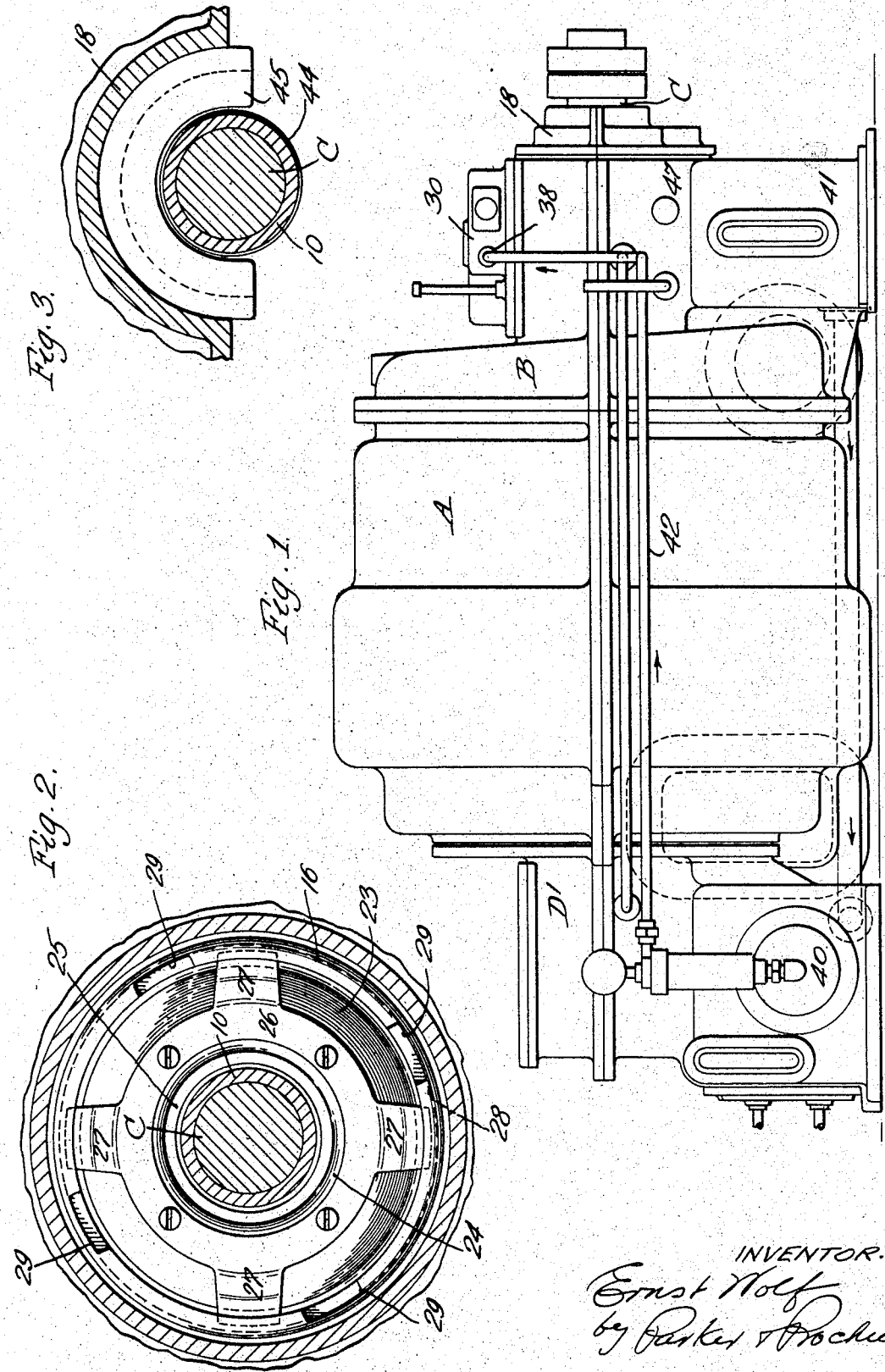

Patented Jan. 20, 1931

1,789,329

UNITED STATES PATENT OFFICE

ERNST WOLF, OF LEIPSIG, GERMANY, ASSIGNOR TO CARRIER ENGINEERING CORPORATION, OF NEWARK, NEW JERSEY

SEALING AND THRUST BALANCING MEANS FOR ROTARY COMPRESSORS AND ANALOGOUS MACHINES

Application filed November 23, 1923, Serial No. 676,667, and in Germany April 19, 1923.

This invention relates to means for use with rotary gas compressors, vacuum pumps and analogous machines for balancing the end thrust on the rotor shaft of the machine and relieving the consequent friction, and for providing a substantially frictionless gas-tight seal or closure for the opening through which the rotor shaft passes out of the compressor casing for connection with a driving motor or other device. More particularly my invention relates to improvements in a mechanism for a similar purpose disclosed in United States Letters Patent No. 1,575,970 to Willis H. Carrier. While the invention is specially desirable for use on the centrifugal exhausters or compressors of refrigerating apparatus, it is not restricted to such use but is applicable to elastic fluid compressors and analogous machines for other purposes in which it is important to reduce the friction to the minimum and to seal the shaft opening against the leakage of air or gas therethrough, both when the machine is and is not in operation.

One object of the invention is to provide an efficient and practical fluid pressure means of novel construction for balancing or taking the end thrust of the rotor shaft of the machine and for eliminating the friction which would be incident to the use of a thrust bearing in which there is metal to metal contact. Another object is to provide an efficient and reliable closure device of novel construction for the shaft opening of the machine comprising a substantially frictionless liquid seal which prevents the leakage of air or gas through the shaft opening when the machine is running, and a valve or element which automatically closes the shaft opening against the passage therethrough of air or gas when the machine is not running. Still another object is to provide a single device which performs the triple function of a thrust balancing device, a valve for closing the shaft opening when the machine is not running, and a liquid seal for the shaft opening when the machine is running. A further object of the invention is to simplify and improve thrust balancing and sealing mechanisms of the sort mentioned in the other respects hereinafter described and set forth in the claims.

In the accompanying drawings:

Fig. 1 is an elevation of a rotary gas compressor or exhauster provided with sealing and thrust balancing means embodying my invention.

Figs. 2 and 3 are transverse sections thereof on lines 2—2 and 3—3, Fig. 4, respectively.

Fig. 4 is an enlarged longitudinal sectional elevation of a portion of the compressor showing the liquid sealing and thrust balancing means.

A represents the enclosing casing or housing of the compressor. This invention is not concerned with the construction of the compressor proper and this may be of known or suitable construction, the drawings indicating in Fig. 1 the exterior of a multiple stage compressor having a plurality of rotary impellers, the last of which, at the compression end of the machine, delivers into a discharge chamber B. C represents the rotor shaft of the machine. This shaft is journalled in suitable bearings at opposite ends of the compressor casing. D, Fig. 4, indicates the bearing for the right-hand end of the shaft. The bearing for the opposite end of the shaft is not shown but is inclosed within the portion of the casing designated D' in Fig. 1. One end of the shaft C, the right-hand end thereof, as illustrated in the drawings, extends out of the compressor casing for connection with a driving turbine or other motor or device. The other end of the shaft C is completely housed or enclosed by the compressor casing so that it is only necessary to provide a single sealing or closure device for that end of the shaft which extends out of the casing.

The compressor is of a design such that it produces an end thrust on the shaft C in one direction, that is in a left-hand direction as shown in Figs. 1 and 4, and the shaft is mounted so that it is adapted to have a slight endwise movement in its bearings. This thrust is balanced or resisted and prevented from causing friction by the following means:

10 represents a combined thrust balancing and sealing member or collar, hereinafter called the sealing member, which surrounds and is fixedly secured or formed on the shaft. As shown in the drawings, this member is stationarily secured on the shaft between a shoulder 11 on the shaft and a coupling member 12 secured on the outer end of the shaft. The sealing member 10 faces a stationary, annular member or part 13 of the compressor casing, which acts as a stop to limit the movement of the shaft to the left, due to the end thrust thereon, and forms the inner end of an annular sealing chamber 14 which surrounds the shaft C and into which the sealing member 10 projects and is adapted to rotate. Preferably the stop member 13 is formed by a separate sleeve or bushing which surrounds the shaft and is stationarily secured in an opening or seat 15 in the end of the compressor casing by a separate cylinder or part 16 which surrounds the shaft C and fits in an annular seat 17 in the end of the compressor casing and engages the outer end of the bushing 13. This cylinder 16, in turn, is secured in its seat 17 by an end piece 18 which is suitably secured, for instance by bolts 20, on the end of the compressor casing and has an opening 18a through which the shaft C extends out of the compressor casing. This end piece is provided with a circular rib 19 which engages the peripheral portion of the cylinder 16 so that when the securing bolts 20 for the end piece 18 are tightened, the end piece will force the cylinder 16 tightly into its seat 17, and the cylinder 16, which engages the outer end of the bushing 13, will force the latter tightly into place in its seat 15 and secure it. A gastight joint is formed between the end piece 18 and the cylinder 16 and end of the casing so that there can not be any leakage around the cylinder. As shown, the sealing chamber 14 is formed by an annular recess in the inner end of the cylinder 16.

Liquid, preferably lubricating oil, is supplied under pressure to the sealing chamber 14, as hereinafter explained, through passages leading to the end face of the stop bushing 13, the oil being adapted to escape between the end face of the bushing and the opposing face of the sealing member into the sealing chamber 14. The oil is maintained under pressure between said opposing faces during the operation of the compressor, as, for example, by an oil pump such as shown in said carrier Patent No. 1,575,970, geared to the compressor shaft, and the pressure thereof against the inner end of the sealing member 10 tends to move the same and the shaft C in opposition to the end thrust acting on the shaft, thereby balancing or yieldingly resisting said end thrust. This oil pressure is sufficient to hold the sealing member 10 slightly away from the opposing stop member 13 so that the oil thus forms a liquid cushion which prevents actual contact between the metal parts 10 and 13 and prevents appreciable friction due to the end thrust on the shaft.

The cylinder or part 16 before mentioned, which is annular and surrounds the shaft C, is provided with concentric outer and inner cylindrical flanges 21 and 22 which preferably extend in opposite directions, the former outwardly and the latter inwardly parallel with the shaft C. 23 indicates an annular piston arranged to slide lengthwise in the cylinder formed by the outer flange 21. This piston has a tubular hub portion 24, surrounding the shaft C, which slidably fits in the hollow inner flange 22 of the cylinder, and the hub 24 is provided with a flanged or broad inner end 25 which is disposed opposite and adjacent to the outer face of the sealing member 10. A suitable spring 26 acts on the piston 23, tending to move it inwardly and cause the inner end of its hub to contact with the sealing member 10. The spring 26 may be of any suitable type but preferably consists of a spring plate secured to the outer end of the piston and having radial arms 27 which are seated in an internal circular groove 28 in the outer end portion of the cylinder flange 21, the piston thus being retained in the cylinder by the spring. The spring can be inserted into place in the groove 28 simply by moving the spring arms inwardly through slots 29 in the end of the flange 21 connecting with the groove 28, and then turning the spring until the arms engage in the groove 28.

During the operation of the machine the liquid or sealing oil is also delivered under pressure to the cylinder 16 and acts to move the piston outwardly against the action of the spring 26 so as to hold the end 25 of the piston hub slightly out of contact with the sealing member 10. In the normal operation of the device, the clearances between the sealing member 10 and the stop member 13, and between the sealing member and the end 25 of the piston hub, are very slight, only sufficient to permit the passage of the sealing liquid through the spaces between these parts.

For the purpose of supplying the oil under pressure to the cylinder 16 and sealing chamber 14, the following construction is preferably employed: 30 represents a reservoir into which the oil or sealing liquid is delivered by a suitable pump which operates when the compressor is running so as to maintain the liquid under pressure in the reservoir whenever the compressor is in operation. The oil is delivered from this reservoir to the sealing chamber 14 through a passage 31 leading from the lower portion of the oil reservoir and connecting by an annular chamber 32 and one or more ports 32a in the stop bushing 13, with an annular groove 33 in the end face of the bushing 13, preferably at the inner portion thereof or near the shaft C.

The upper portion of the oil reservoir 30 is also connected with the sealing chamber 14 by a second passage 34, a second chamber 35 in the bushing 13, and one or more ports 35a to the outer end of the bushing, these ports 35a being preferably disposed further from the center of the shaft than the groove 33. The passage 34 preferably has an upward extension or standpipe 36 extending up into the oil reservoir 30 and the oil can enter the passage 34 only when the oil rises in the reservoir to the open upper end of the standpipe 36. The passage 34 also connects by one or more ports 37 with the cylinder 16 to deliver the oil to the cylinder for operating the piston 23. When the compressor is running the oil is delivered to the reservoir 30 through an inlet 38, Fig. 4, and is maintained under sufficient pressure in the reservoir to compress the air in the reservoir above the oil and permit the oil to rise high enough to enter the standpipe and discharge through the passage 34. When the compressor is not running, the oil is not delivered to the reservoir, so that the pressure therein is relieved and when the oil lowers therein to a level below the top of the standpipe, then the oil can discharge from the reservoir only through the lower passage 31. While the compressor is in operation, therefore, the oil under pressure operating on the piston 23 will move the latter outwardly against the action of the spring 26 and hold the inner end 25 of the piston hub out of contact with the sealing member 10. Also the pressure of the oil or liquid from the reservoir through the passage 31 and the ports 32a will act against the inner face of the sealing member 10 and hold the latter out of contact with the opposing face of the stop bushing 13 in opposition to the end thrust on the shaft. The oil under pressure will also pass from the passage 34 through the ports 35a to the space between the sealing member and the opposing stop member. Thus the oil is delivered to the sealing chamber 14 and the rotation of the sealing member in the chamber acts centrifugally to retain a body of oil in the outer portion of this chamber around the outer edge of the sealing member, thereby forming an effective liquid seal which prevents the leakage of air or gas past the same into or out of the compressor casing. When the compressor stops or is not running the pressure in the reservoir 30 will be relieved, as above explained, and this will relieve the pressure in the upper passage 34 and the cylinder 16 and the piston 23 will then be moved inwardly by its spring 26 until the end 25 of the piston hub engages the sealing member and moves the shaft inwardly until arrested by the engagement of the sealing member with the outer face of the stop bushing 13. The sealing member then acts as a valve seating against the stop member 13 to prevent the passage of air or gas between these parts. At this time the oil will be delivered under a slight head or pressure, due to the elevation of the oil reservoir 30, through the ports 32a to the outer face of the stop member and is adapted to seep through between the latter and the sealing member, thereby maintaining an oil film between these parts which supplements the seating of the valve in effectually closing the shaft opening and preventing the leakage of air or gas therethrough when the compressor is stationary. At such times, air can leak into the cylinder 16 between the end of the piston and the sealing member and enter the oil reservoir 30 through the passage 34 and standpipe 36, which thus serve as an air vent for the reservoir to permit the discharge of the oil from the same through the lower passage 31 to the valve seat. A plurality of shallow concentric circular grooves 39 are preferably formed in the outer end of the stop bushing 13 opposite the sealing member 10 and surrounding the ports 32a and 35a. The oil collects in a succession of concentric rings in the grooves 39 which further increase the efficiency of the seal.

The machine is provided with an oil circulating pump of any suitable kind, indicated at 40, Fig. 1, which, when the compressor is running, is adapted to draw the oil from an oil tank 41 to which the oil can flow from the sealing chamber 14 through a suitable trap (not shown) and the pump 40 delivers the oil through a discharge pipe 42 to the inlet 38 of the oil reservoir. The oil pump is operatively connected with the compressor or is otherwise driven so that it acts to always maintain the oil under pressure in the reservoir 30 while the compressor is in operation. The pump 40 is also used to deliver oil to the shaft bearings, the oil inlet for the bearing D being shown at 43, Fig. 4.

In order to prevent the oil or sealing liquid which discharges from the sealing chamber 14 from escaping through the shaft opening 18a and being lost, the hub of the sealing member is preferably provided at its outer end portion with a series of peripheral oil-throwing edges or ridges 44 which are adapted to throw the oil onto a plurality of closely spaced plates 45 which are secured in the end piece 18 and straddle the upper portion of the hub of the sealing member. These plates are substantially semi-circular in form extending around only the upper half or portion of the hub of the sealing member and the oil which is thrown onto the same from the ridges 44 runs down and drips off of the opposite ends of the plates 45 into the hollow end piece 18, from which it flows through a return passage 46 to the trap chamber 47 leading to the collecting tank 41 from which the oil pump returns the oil to the reservoir 30. 48 indicates ordinary oil arresting rings surrounding the shaft in the shaft opening 18a.

A similar oil arrester 49 is preferably provided at the inner end of the shaft bearing D for preventing the oil from escaping along the shaft into the compressor casing.

As a further safeguard to prevent the oil from working along the shaft C into the compressor casing, a centrifugal oil eliminating device 50 is provided on the shaft between the bearing D and the discharge chamber B of the compressor, but this oil eliminator is not shown or described in detail herein, the same being the invention of another.

In the claims, reference is made to a sealing chamber having a face which cooperates with a sealing member. By the use of the word "chamber" I intend to mean a structure having an enclosed space or compartment with a wall of the compartment or space corresponding to the face of the chamber referred to in the claims.

I claim as my invention:

1. The combination with a fluid compressor or analogous machine having a rotary shaft extending through an opening in the machine casing, of a liquid sealing means for preventing leakage of gas through said shaft opening comprising an annular sealing chamber surrounding said shaft, an annular sealing member on said shaft arranged to rotate in said sealing chamber, said chamber and member having opposed normally contacting faces, means which operate while the machine is running to deliver liquid under pressure between said opposed faces whereby the liquid pressure on said faces holds the same out of contact against opposing end thrust on the shaft and a liquid seal for said shaft opening is formed by said liquid in said chamber while the machine is running, automatic means which presses said annular member against said opposing face when the rotation of said shaft stops to form a closure for said shaft opening, and additional means actuated by said pressure liquid which holds said automatic means from its said action while the machine is running.

2. The combination with a fluid compressor or analogous machine having a rotary shaft extending through an opening in the machine casing and constructed to produce end thrust on said shaft axially in one direction, of a liquid sealing means for preventing leakage of gas through said opening comprising an annular sealing chamber surrounding said shaft, an annular sealing member fixed on said shaft to rotate in said sealing chamber, said sealing chamber and sealing member having adjacent opposed faces so disposed that the end thrust on said shaft tends to move them into contact, and means which operates while the machine is running to deliver liquid under pressure between said opposing faces whereby the liquid acts on said sealing member to hold said opposing faces out of contact in opposition to said end thrust and forms a liquid seal between said opposing faces to seal said shaft opening.

3. The combination with a fluid compressor or analogous machine having a rotary shaft extending through an opening in the machine casing, of a liquid sealing means for preventing leakage of gas through said opening comprising an annular sealing chamber surrounding said shaft, an annular sealing member fixed on said shaft to rotate in said sealing chamber, said sealing chamber and sealing member having adjacent opposed faces which the end thrust on said shaft tends to move into contact, means which operates while the machine is running to deliver liquid under pressure between said opposing faces whereby the liquid acts on said sealing member to hold said opposing faces out of contact in opposition to said end thrust and forms a liquid seal between said opposing faces to seal said shaft opening, an operating device which acts on said shaft to move said opposing faces into contact and form a closure for said shaft opening when the rotation of said shaft stops, and additional means actuated by said pressure liquid which holds said operating device from its said action while the machine is running.

4. The combination with a fluid compressor or analogous machine having a rotary shaft extending through an opening in the machine casing, of a liquid sealing means for preventing leakage of gas through said opening comprising an annular sealing chamber surrounding said shaft, an annular sealing member fixed on said shaft to rotate in said sealing chamber, said sealing chamber and sealing member having adjacent opposed faces which the end thrust on said shaft tends to move into contact, means which operates while the machine is running to deliver liquid under pressure between said opposing faces whereby the liquid acts on said sealing member to hold said opposing faces out of contact in opposition to said end thrust and forms a liquid seal between said opposing faces to seal said shaft opening, and an automatic device which acts to move said opposing faces into contact and form a closure for said shaft opening when the rotation of the shaft stops, said liquid pressure acting on said device and preventing said automatic action thereof when said machine is running.

5. The combination with a fluid compressor or analogous machine having a rotary shaft extending through an opening in the machine casing, of a liquid sealing means for preventing leakage of gas through said opening comprising an annular sealing chamber surrounding said shaft, an annular sealing member fixed on said shaft to rotate in said chamber, said sealing chamber and sealing member having adjacent opposed faces which the end thrust on said shaft tends to move into contact, means which operates while the machine is running to deliver liquid under pressure between said opposing faces whereby the liquid acts on said sealing member to hold said opposing faces out of contact in opposition to said end thrust and forms a liquid seal between said opposing faces to seal said shaft opening, a spring-actuated operating device which acts to move said opposing faces into contact when the rotation of said shaft stops, and means for delivering liquid under pressure to said operating device when the machine is running to oppose the movement of the same by its spring.

6. The combination with a fluid compressor or analogous machine having a rotary shaft extending through an opening in the machine casing, of a liquid sealing means for preventing leakage of gas through said opening comprising an annular sealing chamber surrounding said shaft, an annular sealing member fixed on said shaft to rotate in said sealing chamber, said sealing chamber and sealing member having adjacent opposed faces which the end thrust on said shaft tends to move into contact, means which operates while the machine is running to deliver liquid under pressure between said opposing faces whereby the liquid acts on said sealing member to hold said opposing faces out of contact in opposition to said end thrust and forms a liquid seal between said opposing faces to seal said shaft opening, a piston, a spring which acts on said piston to move said opposing faces into contact when the rotation of said shaft stops, and means for causing liquid pressure on said piston to hold the same against action by said spring when the machine is running.

7. The combination with a fluid compressor or analogous machine having a rotary shaft extending through an opening in the machine casing, of a liquid sealing means for preventing leakage of gas through said opening comprising an annular sealing chamber surrounding said shaft, an annular sealing member fixed on said shaft to rotate in said sealing chamber, said sealing chamber and sealing member having adjacent opposed faces which the end thrust on said shaft tends to move into contact, means which operates while the machine is running to deliver liquid under pressure between said opposing faces whereby the liquid acts on said sealing member to hold said opposing faces out of contact in opposition to said end thrust and forms a liquid seal between said opposing faces to seal said shaft opening, a piston having a portion arranged at and adapted to contact with the side of said sealing member opposite that on which said liquid acts, means for delivering liquid under pressure to said piston to hold said portion thereof out of contact with said sealing member when said machine is running, and means for moving said sealing member toward said opposing face of said sealing chamber when the rotation of said shaft stops.

8. The combination with a fluid compressor or analogous machine having a rotary shaft extending through an opening in the machine casing and which causes end thrust in one direction on said shaft, of an annular member fixed on said shaft, an annular stop member surrounding said shaft adjacent said first annular member, said annular members having opposed faces adapted to contact to limit the movement of said shaft by said end thrust, a cylinder surrounding said shaft, a piston movable in said cylinder and having a portion arranged to engage said annular member for moving the same toward said stop member, a spring acting on said piston for so moving said annular member, and means for delivering liquid under pressure to said cylinder and between said opposing faces when said machine is running to hold said faces out of contact in opposition to said end thrust and to hold said piston out of contact with said annular member in opposition to said spring.

9. The combination with a fluid compressor or analogous machine having a rotary shaft extending through an opening in the machine casing, of means for delivering liquid under pressure to form a liquid seal for said shaft opening, and an arrester for said sealing liquid between said sealing chamber and said shaft opening, said liquid arrester comprising liquid-throwing edges on said shaft, and a plurality of spaced plates partially only surrounding said shaft opposite said liquid-throwing edges and constructed to catch the liquid thrown off from said edges and divert the same away from said shaft.

10. The combination with a fluid compressor or analogous machine having a rotary shaft extending through an opening in the machine casing, of a liquid sealing means for preventing leakage of gas through said opening comprising a bushing surrounding said shaft, a cylinder surrounding said shaft adjacent said bushing, means for securing said bushing and cylinder stationarily in said casing, said cylinder and bushing forming an annular sealing chamber around said shaft, an annular sealing member fixed on said shaft to rotate in said sealing chamber, a piston movable in said cylinder and having a portion adapted to engage said sealing member, means which operates while the machine is running to deliver liquid under pressure to said sealing chamber and cylinder to hold said sealing member out of contact with said bushing and said piston, and means for actuating said piston to move said sealing member into contact with said bushing when the rotation of said shaft stops.

ERNST WOLF.